United States Patent
Dantlgraber

(10) Patent No.: US 7,811,080 B2
(45) Date of Patent: Oct. 12, 2010

(54) INJECTION UNIT

(75) Inventor: Joerg Dantlgraber, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 11/915,299

(22) PCT Filed: Feb. 24, 2006

(86) PCT No.: PCT/DE2006/000346

§ 371 (c)(1),
(2), (4) Date: Apr. 28, 2008

(87) PCT Pub. No.: WO2006/125406

PCT Pub. Date: Nov. 30, 2006

(65) Prior Publication Data

US 2008/0268091 A1   Oct. 30, 2008

(30) Foreign Application Priority Data

May 24, 2005   (DE) .................. 10 2005 023 892

(51) Int. Cl.
*B29C 45/50* (2006.01)

(52) U.S. Cl. ............... 425/558; 425/145; 425/567; 425/585

(58) Field of Classification Search .......... 425/145, 425/149, 542, 558, 567, 585
See application file for complete search history.

(56) References Cited

U.S. PATENT DOCUMENTS

| | | | |
|---|---|---|---|
| 2,629,132 A * | 2/1953 | Willcox et al. ............ | 425/578 |
| 4,563,939 A * | 1/1986 | Siegrist .................... | 91/275 |
| 5,714,176 A * | 2/1998 | Wurl et al. ............... | 425/145 |
| 5,879,597 A * | 3/1999 | Urbanek .................. | 264/40.1 |
| 5,916,602 A * | 6/1999 | Klaus ...................... | 425/145 |
| 5,935,494 A * | 8/1999 | Wurl et al. ............... | 264/40.1 |
| 6,120,277 A * | 9/2000 | Klaus ...................... | 425/145 |
| 6,527,540 B1 * | 3/2003 | Dantlgraber ............. | 425/589 |
| 2003/0090018 A1 * | 5/2003 | Bulgrin .................... | 264/40.1 |
| 2003/0185932 A1 * | 10/2003 | Chromy et al. .......... | 425/587 |
| 2004/0013764 A1 * | 1/2004 | Dantlgraber ............. | 425/574 |
| 2004/0065974 A1 * | 4/2004 | Dantlgraber ............. | 264/40.5 |
| 2004/0081717 A1 * | 4/2004 | Marazita .................. | 425/150 |
| 2008/0290543 A1 * | 11/2008 | Okamoto et al. ........ | 264/55 |

FOREIGN PATENT DOCUMENTS

| | | |
|---|---|---|
| DE | 39 37 099 | 5/1990 |
| DE | 101 04 109 | 5/2002 |

(Continued)

*Primary Examiner*—Yogendra N Gupta
*Assistant Examiner*—Emmanuel S Luk
(74) *Attorney, Agent, or Firm*—Boyle Fredrickson, S.C.

(57) ABSTRACT

The invention is directed to an injection unit, in particular for an injection molding machine, comprising a screw which is guided in a plastication cylinder in a rotatable and axially movable manner and via which plastic material undergoes plastication and can be injected into a tool cavity. The screw is driven via an electric drive including an electric motor and is operatively connected to a support cylinder having a pressure chamber to which dynamic and/or support pressure can be applied during plastication and injection. The electric motor is coupled to a hydrostatic machine which during plastication is driven by the pressure medium displaced from the pressure chamber and which during injection conveys pressure medium into the pressure chamber so as to build up support pressure.

9 Claims, 1 Drawing Sheet

FOREIGN PATENT DOCUMENTS

| | | |
|---|---|---|
| DE | 102 39 591 | 3/2003 |
| DE | 102 43 248 | 4/2004 |
| EP | 0 760 277 | 3/1997 |
| EP | 0 785 059 | 7/1997 |
| WO | WO 0189799 | 11/2001 |

\* cited by examiner

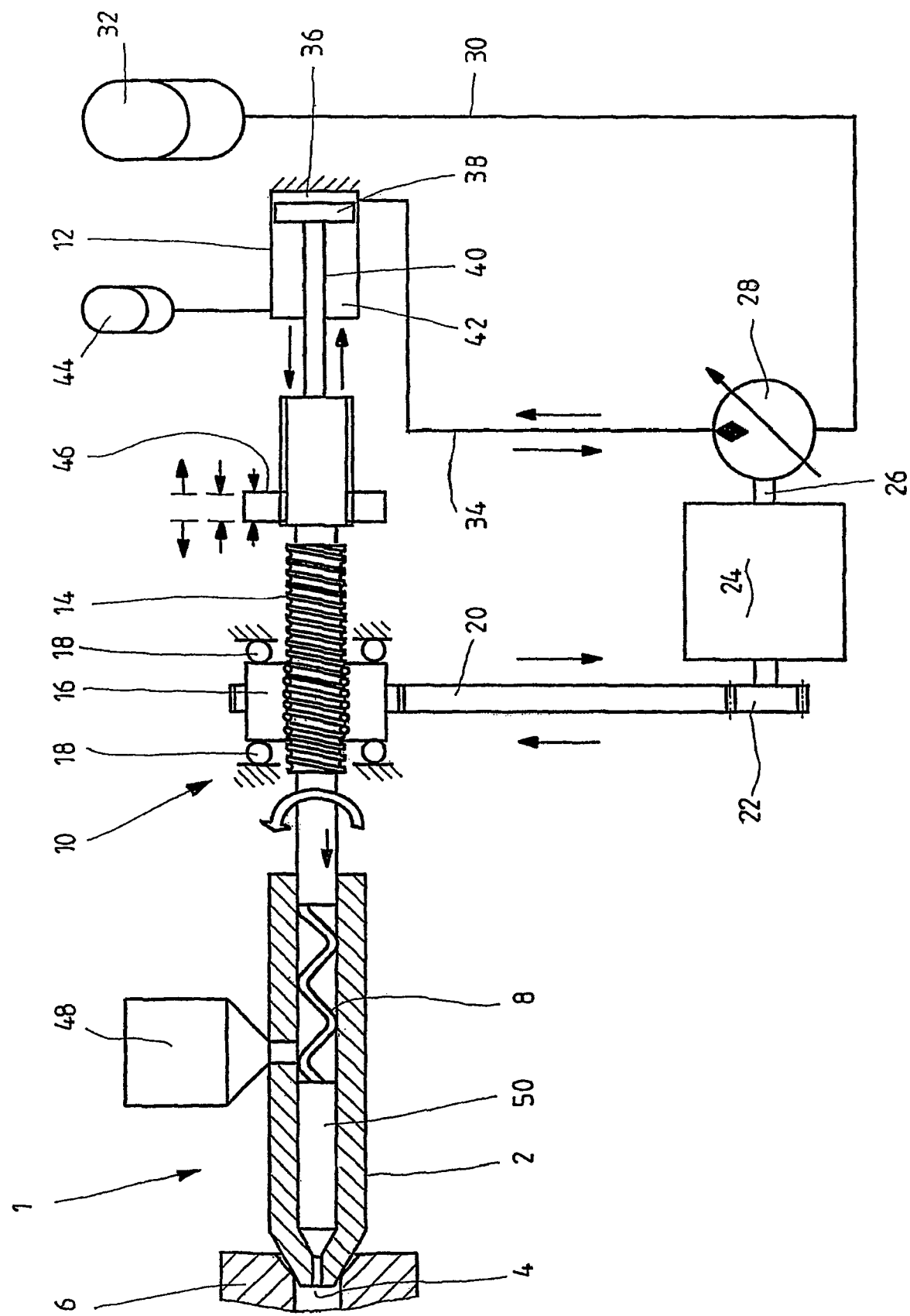

INJECTION UNIT

BACKGROUND

1. Field of the Invention

The invention relates to an injection unit of an injection molding machine, and more particularly, an injection unit that includes a plastication cylinder which facilitates high injecting pressures.

2. Description of the Related Art

During the past few years attempts have been made to replace hydraulic drives for injection molding machines by electric drives, because the control of the latter can be more easily mastered. As electric drives for the clamping unit and the injection unit of injection molding machines frequently screwed drives are used in which the movable tool clamping plate or a screw of the injection unit is operated via a worm gear spindle. It is a drawback in solutions of this type that for applying the clamping forces of the high injecting pressure considerable axial forces act upon the screwed drive and can destroy the same. In order to eliminate this drawback, the screwed drive can be hydraulically supported, for instance, while high forces are applied. Such solution is disclosed, for instance, in DE 101 04 109 A1 and EP 0 760 277 B1. In said known solutions a worm gear spindle actuating the screw of the injection unit is supported via a hydraulic cylinder, the piston rod thereof being connected to the worm gear spindle. Such hybrid solutions having an electric drive and a hydraulic support require a comparatively high expenditure in terms of devices and energy.

Compared to this, the object underlying the invention is to provide an injection unit of an injection molding machine or the like by which high injecting pressures can be applied and which has a reduced energy demand vis-à-vis conventional solutions.

SUMMARY OF INVENTION

This object is achieved by an injection unit having the combination of features described hereinbelow.

According to the invention, the injection unit comprises a plastication cylinder in which a screw is guided in a rotatable and axially movable manner, via which screw the plastic material undergoes plastication and can be injected into a tool cavity. The screw is driven, according to the invention, by an electric screwed drive which is hydraulically supported, wherein a piston of a support cylinder restricts a pressure chamber to which pressure is applied during plastication and injection. In accordance with the invention, an electric motor of the screwed drive is coupled to a hydrostatic machine which is driven by the pressure medium displaced by the piston during plastication and which conveys pressure medium into the pressure chamber during injection so as to build up a support pressure relieving the screwed drive.

Consequently, in this solution during plastication the dynamic pressure output is supplied to the plastication operation, because the hydrostatic machine then acts as a motor which additionally drives the screwed drive. During injection the hydrostatic machine acts as a pump by which a support pressure is built up in said pressure chamber.

In an especially preferred embodiment the cylinder is a differential cylinder the bottom-side cylinder chamber of which forms the pressure chamber and a biasing pressure can be applied to the annular chamber thereof on the piston rod side.

Such biasing can be required, for example, in the case of very low dynamic pressures and can be brought about by means of a hydraulic reservoir connected to the annular chamber.

In a preferred embodiment the hydrostatic machine has an adjustable design, the dynamic pressure and/or the support pressure being controllable via the slewing angle.

In the solution according to the invention the low-pressure port of the hydrostatic machine is preferably connected to a pressure reservoir.

The screw of the plastication cylinder can be prevented from rotating by a brake during injection.

These, and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWING

FIG. 1 is a schematic drawing of an injection unit according to the preferred embodiments.

DETAILED DESCRIPTION

Hereinafter a preferred embodiment of the invention will be explained by way of a schematic drawing illustrating a functional diagram of an injection unit according to the invention.

Said injection unit 1 comprises a plastication cylinder 2, wherein plasticated molding material can be injected into a tool cavity via the nozzle 4 of said cylinder and a sprue bushing 6 of a tool. In the plastication cylinder 2 a screw 8 is guided in a rotatable and axially movable manner and is driven by means of an electric screwed drive 10. The latter can be in the form of a spherical roller spindle, for instance. A support cylinder 12 by which an axial force can be applied to the screw 8 for controlling a dynamic or injection pressure is allocated to the screwed drive 10. In the shown embodiment the screwed drive 10 includes a spindle 14 in the form of a recirculating ball spindle which engages with a nut 16 (recirculating ball nut). The latter is supported in axial direction via axial bearings 18 on a base of the machine tool or on the housing of the injection unit. In the shown embodiment, the rotatably supported nut 16 is driven via a toothed belt 20 meshing with a drive pinion 22 of an electric motor 24. The electric motor includes a frequency converter so that the speed of the electric motor is variable and reversible. An output shaft 26 of the electric motor 24 is coupled to a hydrostatic machine 28 which can act both as pump and as hydraulic motor. The hydrostatic machine 28 is designed to include an adjustable slewing angle which is predetermined as control variable for the control of the pressure at the support cylinder 12 via a machine control.

A low-pressure port of the hydrostatic machine 28 is connected via a storage line 30 to a hydraulic reservoir 32—i.e. the hydraulic system is a closed system and can be integrated in the injection molding machine so that the hydraulic components are not visible from outside and the injection molding machine corresponds to that of a purely electric injection molding machine as regards its appearance.

A pressure port of the hydrostatic machine 28 is connected via a pressure line 34 to a pressure chamber 36 of the support cylinder 12. The latter is in the form of a differential cylinder, wherein the pressure chamber 36 is a bottom-side cylinder chamber restricted by a piston 38 of the support cylinder 12, while an annular chamber 42 through which a piston rod 40 is passed is connected to a biasing reservoir 44. The piston rod 40 is connected to the spindle 14 to which a brake 46 is allocated by which rotation of the spindle 14 can be prevented. The plastic material to be plasticated is supplied via a feed hopper 48 ending into the screw chamber 50.

For plastication the electric motor 24 is controlled and the screw 14 is rotated in the direction of the arrow so that material is withdrawn from the feed hopper 48 and conveyed into the screw chamber 50. The brake 46 is not engaged. In the screw chamber 50 a dynamic pressure is built up by which the screw 8 is shifted in axial direction to the right along with the screwed spindle 14. Accordingly, pressure medium is displaced from the cylinder chamber 36 and drives the hydrostatic machine 28 now acting as hydraulic motor. The dynamic pressure output is thus added via the hydrostatic machine 28 to the output of the electric motor 24 and thus supplied to plastication so that the electric motor 24 is loaded to a smaller extent. The dynamic pressure can be controlled by adjusting the slewing angle of the hydrostatic machine 28.

In the case in which only very low dynamic pressures have to be applied it may be advantageous to apply a bias which then counteracts the dynamic pressure prevailing in the pressure chamber 36 in the enlarging annular chamber 42 to the support cylinder 12. Said biasing pressure is predetermined by the pressure prevailing in the biasing reservoir 44. Since such bias is not constantly required, however, the connection to the biasing reservoir 44 can be blocked by a shift valve not shown or can be completely dispensed with.

After plastication of the plastic material the direction of rotation of the electric motor 24 is converted via the frequency converter and the brake 46 engages so that rotation of the spindle 14 is stopped, but it remains movable in axial direction. By driving the nut 16 the spindle 14 and thus the screw 8 are shifted to the left in the direction of the arrow and the plasticated molding mass is displaced from the reducing screw chamber 50 and is injected into the tool cavity through the nozzle 4. The die is then completely filled during a holding pressure phase. During said injecting operation the hydrostatic machine 28 acts as a pump and conveys pressure medium from the hydraulic reservoir 32, via the storage line 30 and the pressure line 34 into the enlarging pressure chamber 36. The hydrostatic machine 28 is driven by the electric motor 24. The pressure building up in the pressure chamber 36 supports the spindle 14 in axial direction so that the screwed drive 10 is relieved. Said support pressure in turn can be controlled by adjusting the slewing angle of the hydrostatic machine 28 during the injecting and subsequent pressure phase. Thus the slewing angle of the hydrostatic machine 28 in turn is the control variable for the controlled pressure in the pressure chamber 36. After the holding pressure phase the electric motor 24 is converted again and plastic material is in turn conveyed into the screw chamber 50—the cycle starts again.

In the above-described embodiment a screwed drive comprising a recirculating ball spindle has been used, on principle also other electric drives can be utilized for the screw 8 by which the latter is movable and rotatable in axial direction.

The afore-described concept can also be employed in a clamping unit, wherein for closing the tool in rapid traverse the electric drive can be assisted by a support cylinder 12 via which the electric drive is supported during the holding pressure phase in which very high clamping forces are active. Applicant reserves itself to direct a separate independent claim to a clamping unit of this type. There is disclosed an injection unit, in particular for an injection molding machine, comprising a screw which is guided in a plastication cylinder via which the plastic material undergoes plastication and can be injected into a tool cavity. The screw is electrically driven and is connected to a support cylinder by which dynamic and/or support pressure can be applied. An electric motor of the electric drive of the screw is coupled to a hydrostatic machine which is driven by the pressure medium displaced from the pressure chamber during plastication and acts as pump during the injecting operation in order to convey pressure medium into the pressure chamber and to build up support pressure.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:

1. An injection unit, in particular for an injection molding machine, comprising a plastication screw which is guided in a plastication cylinder in a rotatable and axially movable manner and via which plastic material undergoes plastication and can be injected into a tool cavity, wherein the plastication screw is driven via a screwed drive that is operably connected to an electric drive including an electric motor, the screwed drive being operatively connected to a support cylinder such that the support cylinder supports the screwed drive and the plastication screw, and wherein the support cylinder includes a pressure chamber to which dynamic and/or support pressure can be applied during plastication and injection, characterized in that the electric motor is coupled to a hydrostatic machine which during plastication is driven by the pressure medium displaced from the pressure chamber and which during injection conveys pressure medium into the pressure chamber so as to build up support pressure, and wherein a brake is allocated to a spindle of the screwed drive.

2. An injection unit according to claim 1, wherein the support cylinder is a differential cylinder the bottom-side cylinder chamber of which forms the pressure chamber and a biasing pressure can be applied to an annular chamber thereof on the piston rod side.

3. An injection unit according to claim 2, wherein the annular chamber on the piston rod side is connected to a biasing cylinder.

4. An injection unit according to claim 1, wherein the hydrostatic machine has an adjustable design.

5. An injection unit according to claim 1, wherein a low-pressure port of the hydrostatic machine is connected to a hydraulic reservoir.

6. An injection unit according to claim 1, wherein the electric drive rotates a nut of the screwed drive.

7. An injection unit for use in an injection molding machine, comprising:
    a plastication cylinder;
    a plastication screw being rotatable and housed within the plastication cylinder and configured to inject plastic material into a tool cavity;
    a screwed drive connected to and rotatably driving the plastication screw;
    a support cylinder reciprocally housing a piston therein, the piston being operably connected to and axially moving in unison with the screwed drive;

an electric motor connected to and rotating the screw drive so as to correspondingly rotate the plastication screw connected to the screw drive;

a hydrostatic machine connected to the electric motor and the support cylinder; and a pressure medium fluidly coupling the support cylinder and the hydrostatic machine, wherein (i) displacing the pressure medium from the support cylinder drives the hydrostatic machine, supplementing the rotation of the screw electric motor, (ii) introducing the pressure medium into the support cylinder axially moves the screw drive and the plastication screw toward the tool cavity, and (iii) the screw drive moves in unison with the plastication screw while the pressure medium is displaced from or introduced into the support cylinder.

8. An injection unit according to claim 7, wherein the support cylinder comprises (i) an annular chamber provided at a first end thereof, and (ii) a cylindrical pressure chamber at a second end thereof.

9. An injection unit according to claim 7, further comprising a brake that engages an outer circumferential surface of a spindle of the screw drive.

* * * * *